United States Patent [19]

Mancini et al.

[11] 4,243,540
[45] Jan. 6, 1981

[54] ORGANIC ESTERS FOR LUBRICATING COMPOSITIONS

[75] Inventors: Giuseppe Mancini, Melegnano; Luigi Imparato, Milano, both of Italy

[73] Assignee: Snamprogetti S.p.A., Milanese, Italy

[21] Appl. No.: 89,468

[22] Filed: Oct. 30, 1979

Related U.S. Application Data

[63] Continuation of Ser. No. 971,823, Dec. 21, 1978, abandoned, which is a continuation of Ser. No. 908,356, May 22, 1978, abandoned, which is a continuation of Ser. No. 756,403, Jan. 3, 1977, abandoned, which is a continuation of Ser. No. 486,868, Jul. 9, 1974, abandoned.

[30] Foreign Application Priority Data

Jul. 9, 1973 [IT]   Italy ............................... 26335 A/73

[51] Int. Cl.$^3$ ............................. C09F 5/08; C11C 3/00
[52] U.S. Cl. ................................ 252/56 S; 260/410.6
[58] Field of Search ................... 260/410.6; 560/263; 252/56 S

[56] References Cited

U.S. PATENT DOCUMENTS

| | | | |
|---|---|---|---|
| 2,991,297 | 7/1976 | Cooley | 260/410.6 |
| 3,560,387 | 2/1971 | Schritt | 252/56 S |
| 3,640,858 | 2/1972 | Harr | 260/410.6 |
| 3,670,013 | 6/1972 | Leibfried | 260/410.6 |
| 3,694,382 | 9/1972 | Kleiman | 260/410.6 |

OTHER PUBLICATIONS

Barnes R. et al., "Lubrication Engineering", Aug. 1957, pp. 454-458.

*Primary Examiner*—John F. Niebling
*Attorney, Agent, or Firm*—Morgan, Finnegan, Pine, Foley & Lee

[57] ABSTRACT

An ester, adapted for use as a component of a multigrade lubricating oil, is prepared by reacting:

A. A mixture of bifunctional and trifunctional polyols wherein the molar ratio of the bifunctional polyols to the trifunctional polyols is in the range of 1:2.5 to 1:10; and B. A mixture of linear monocarboxylic acids containing from 6 to 8 carbon atoms, wherein the molar average is $C_7$, and of linear monocarboxylic acids containing from 12 to 18 carbon atoms, the molar ratio of the $C_6$ to $C_8$ acids and the $C_{12}$ to $C_{18}$ acids being in the range of from 4:1 to 19:1.

9 Claims, No Drawings

ORGANIC ESTERS FOR LUBRICATING COMPOSITIONS

This is a continuation of application Ser. No. 971,823 filed Dec. 21, 1978, abandoned, as a continuation of Ser. No. 908,356, filed May 22, 1978 abandoned as a continuation of Ser. No. 756,403, filed Jan. 3, 1977 abandoned as a continuation of Ser. No. 486,868 filed July 9, 1974 now abandoned.

The present invention relates to synthetic components of lubricants for internal combustion engines and particularly to organic esters to be employed in admixture with mineral bases in the lubrication of automobile engines. It is well known that synthetic oils have become very important in the automobile field in recent years and it is also known that esters perform a substantial function in this field.

The use of synthetic products involves the solution of numerous problems of physical, chemical, technological nature. This entails a suitable selection of the molecular structure of the synthetic base and of the processes to be followed in its preparation.

These problems present special aspects in the case of multigrade lubricating oils for use in automobile engines: the conditions which take place during operation, require that the oil have relatively low volatility with respect to its viscosity so as to maintain relatively low consumption at high temperatures; it is necessary further that the characteristics of viscosity-temperature be such as to permit easy starting of the engine when the external temperature is several degrees below 0° C. and to warrant, at the same time, good lubrication at the highest temperatures which may be reached during the operation.

Such results can be obtained either by using completely synthetic bases or by using mixed bases, those which are partially mineral and are suitably provided with addition substances. In this latter case the synthetic component performs an essential task since it must favorably modify the general characteristics of the oil, namely to balance the deficiencies notoriously shown by the mineral component.

Through the processes described hereinafter it is possible to prepare synthetic products, and particularly esters, suitable for the formulation of multigrade oils based on synthetic-mineral oils. Generally the esters which form the subject of the present invention are obtained through the reaction between two or more different types of polyhydroxylic compounds and two or more different types of monocarboxylic acids, provided the chemical types employed and the ratios between the different chemical types are suitably chosen so as to give products of desired characteristics.

The polyhydroxylic compounds which can be employed for this purpose are of the following type:

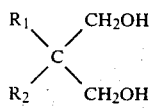

wherein $R_1$ may be —$CH_3$ or —$CH_2OH$ while $R_2$ can be —$CH_3$ or —$C_2H_5$.

The monocarboxylic acids are of the type R—COOH where R represents a hydrocarbon chain constituted by a number of carbon atoms which may vary from 5 to 7 and from 11 to 17.

The esters obtained from polyols with a neopentylic structure, generally used, have with respect to the others clear advantages of thermal and oxidative stability but occasionally present unsatisfactory rheological characteristics, such for instance as a too high pour point, too low viscosity Index (V.I.), high viscosity at low temperature, and so on. In the case of mixtures with mineral oils it is necessary on the other hand that the ester ensure a fluidifying action under cold treatment such as to permit the use of mineral fractions having a viscosity sufficiently high to reduce to satisfactory values the losses due to evaporation under the operating conditions.

At the same time the ester as such must have a low volatility so as not to adversely affect consumption and a viscosity under hot treatment, sufficiently high as not to affect the requirement of V.I. improvers additives; consequently the lower its viscosity at low temperature and the higher the viscosity at high temperature the more suitable it will be for the above use.

Satisfactory characteristics can be easily obtained with the process described in the examples hereinafter reported, which substantially consists in causing a mixture suitably containing neopentylic polyols of different function to react with a mixture of acids which as an average contains 7 atoms of carbon and a mixture of acids which have a minimum of 12 to a maximum of 18 carbon atoms.

In general the products of the present invention are obtained by causing a group of neopentyl polyols, wherein a bifunctional compound is always present, to react with a group of acids wherein a monocarboxylic acid is always present which has 12 or more atoms of carbon, the two groups being respectively, so constituted as follows:

(a) Bifunctional neopentylpolyol of the following type:

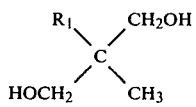

where $R_1$ is preferably —$CH_3$ but can be also —$C_2H_5$, said bifunctional neopentylpolyol being in admixture with a trifunctional neopentylpolyol of the type:

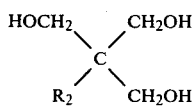

wherein $R_2$ is equal to —$(CH_2)_n$—$CH_3$, wherein preferably n=1, but may be also, in such proportions that the molar ratio between the bifunctional neopentylols and the trifunctional ones is between 1:10 and 1:2.5 preferably between 1:9 and 1:4.

(b) Monocarboxylic acid of the $CH_3$—$(CH_2)_n$—COOH type with n=5 in admixture with acids of the same type but with n ranging from 10 to 16 with the proviso that the acid having n=5 is, with the addition of the other acids, in a molar ratio between 4:1 and 19:1. In turn the acid having n=5 can be substituted by a mixture of acids of the same type having n ranging from 4 to 6 but having a molar weight such that n has an average of 5.

The reaction between acids and polyols occurs in a single phase and can be effected in the presence or in the absence of solvent and at temperatures ranging from 80° to 250° C., preferably between 150° C. and 210° C.

As solvents there can be utilized, for instance, benzene or toluene, which form an azeotropic mixture with the water of reaction.

In the absence of solvent the elimination of water may be effected by blowing with nitrogen or another inert gas or by carrying out the reaction under a moderate vacuum.

As catalysts, the ones normally used in the esterification reactions, and particularly methanesulphonic acid may be employed. The reaction may, however occur in the absence of a catalyst.

The treatment after reaction may consist in a washing with alkaline aqueous solution and then with water, if a non-volatile acid catalyst was used, followed by a stripping with inert gases or at a reduced pressure to eliminate water and traces of by-products having a lower boiling point; or if catalysts were not employed, the alkaline washing may be dispensed with by subjecting the raw material to the stripping directly and possibly eliminating the residual acids with one of the methods used for this purpose and known in a conventional esterification, treatment as by means of absorbing solids separable through filtration, and so on. The following examples which are illustrative and not limitative, will show the process to be followed:

EXAMPLE 1

Product A 0.89 trimethylolpropane moles (g 119.4)
0.11 neopentylglycol moles (g 11.4)
0.574 hexanoic acid moles (g 66.7)
1.1767 heptanoic acid moles (g 153.2)
0.574 octanoic acid moles (g 82.8)
0.2583 lauric acid moles (g 51.7)
0.287 palmitic acid moles (g 73.6)

are reacted in a four neck flask provided with thermometer, stirrer, tube for nitrogen and water separator with associated cooler. The reaction is effected in a nitrogen stream.

The temperature rises gradually to 170° C. after two hours, after 4 hours and one half to 200° C., after 5 hours and one half to 210° C. while the reaction water is collected in the separator. After a total of 9 hours of reaction, the temperature stabilizes at 210° C. with an excess of the initial mixture of acids in an amount corresponding to 10% by weight of the amount previously introduced.

After about 2 hours and one half the stripping with nitrogen starts for a period of four hours and one half.

The final acidity is 2.5 mg KOH/g which decreases to 0.22 after treatment with aluminium oxide.

EXAMPLE 2

Product B 0.16 moles (16.66 grams) of neopentylglycol, 0.64 moles (85.87 grams) of trimethylolpropane and 2.24 moles (g 307.68) of a mixture of monocarboxylic acids consisting of 90% by weight of heptanoic acid, 5% by weight of palmitic acid, 5% by weight of stearic acid are used. To complete the reaction 30 grams of the initial mixture of acids were added.

After stripping and treatment with aluminium oxide an acidity of 0.02 mg KOH/g and a viscosity at 210° F. of 3.92 cSt were reached.

EXAMPLE 3

Product C 0.8 Moles of trimethylolpropane (107.35 grams), 0.2 moles of neopentylglycol (20.80 grams) and 2.8 moles (388.72 grams) of a mixture of monocarboxylic acids constituted by 87.47% by weight of heptanoic acid, 2.88 of dodecanoic acid, 4.82% of palmitic acid, 4.82% stearic acid, are reacted by adding, to complete the reaction, 25 grams of the initial mixture of acids. After the stripping and the treatment with aluminium oxide, a product having an acidity 0.05 mg KOH/g and a viscosity at 210° F. of 3.62 cSt is obtained.

EXAMPLE 4

Product D

We caused 0.89 moles of trimethylolpropane (119.4 grams), 0.11 moles of neopentylglycol (11.5 grams), 2.42 moles of heptanoic acid (315 grams) and 0.46 moles of dodecanoic acid (92 grams) to react.

The acidity of the finished product was 0.03 mg KOH/g and the viscosity was 3.79 cSt at 210° F.

The products B and C were prepared by using methanesulphonic acid as catalyst but omitting to carry out the alkaline washings for the sake of brevity, while in the case of products A and D the reaction was carried out in the absence of the catalyst.

The rheological characteristics of the products were shown in the table hereinafter reported where $V_{100}$, $V_{210}$, $V_0$ respectively indicate the cSt viscosities at 100°, 210° and 0° F.

The viscosity at 0° F., too low to be experimentally measured by means of the Cold Cranking Simulator, was calculated according to the following formula:

$$W_x = \frac{W_1 - W_2}{\log T_2 - \log T_1} (\log T_2 - \log T_x) + W_2$$

where $W_x$ was defined by means of the equation $$W_x = \log-\log(v_x + 0.6)$$

wherein $v_x$ is the viscosity in cSt at the absolute temperature $T_x$. Analogously $W_1$ and $W_2$ were defined. The reported formula, which makes it possible to easily obtain the viscosity $V_x$ at the temperature $T_x$ when viscosity $v_1$ and $v_2$ at the respective temperature $T_1$ and $T_2$ are known, derives like the ASTM papers from the Walther equation but permits a more exact calculation, avoiding the error connected to the graphic method. The constant 0.6 is the one provided by the A.S.T.M. as to viscosity higher than 1.5 cSt.

| | Characteristics of the obtained products | | | |
|---|---|---|---|---|
| | $V_{100}$ | $V_{210}$ | $V_0$ | V.I. (ASTM D 2270) |
| Product A | 20.11 | 4.39 | 435 | 143 |
| Product B | 17.24 | 3.92 | 347 | 137 |
| Product C | 15.44 | 3.62 | 298 | 132 |
| Product D | 16.28 | 3.79 | 313 | 137 |

An examination of the data reported in the table shows that the described process may give results superior to those obtained through the conventional process (reaction between trimethylolpropane and monocarbxylic acid) since it makes it possible to obtain esters having more satisfactory viscosity-temperature characteristics.

It is to be noted for instance (Products C) that it is possible to have esters having a viscosity at 210° F. higher than 3.60 cSt maintaining viscosities, at 0° F. not higher than 300 cSt, the viscosity index being equal to 132. In the series of conventional esters of te trimethylolpropane, triheptanoate (V.I. 124) has a lower viscosity at 210° F. even though it is higher than 300 cSt at 0° F. Among the derivatives having $V_0$ lower than 300 cSt the highest viscosity at 210° F. was given by the trihexanoate which however does not exceed 3 cSt. (V.I. 106)

In so far as products A and D are concerned values corresponding as to the viscosity are not present in the series of trimethylolpropane. But through simple interpolations on the curves ($V_{210}$, $V_0$) and ($V_{210}$, V.I.) it will be noticed that they have $V_0$ lower and V.I. higher than the ones deducible from the series of trimethylolpropane. Particularly it is to be noted for both of them that there is a lowering of $V_0$ of about 40 cSt and an increase in V.I. of about 7 unities.

Product B with a $V_{210}$ of 3.92 and a $V_0$ of 347 is an example of an ester having characteristics suitable for the formulation of multigrade lubricating oils having a gradation of SAE 10 W 50 at the ratio by weight of synthetic base/mineral base of about 1:4. By examining the normal series of the esters obtained from polyols having a neopentylic structure such as pentaerythrite, trimethylol propane and neopentylglycol it will be observed that at 210° F. and at 0° F. it is not possible to achieve the indicated viscosities.

For instance in the neopentylglycol series, if the values with $C_{12}$ acid and higher ones are excluded, which have a pour point which is utterly unsatisfactory, it will be noted that the highest viscosities at 210° F. do not exceed 3.5 cSt. The same limit of viscosity is possessd by the derivatives of the trimethylolpropane obtained by $C_7$ acids and lower acids while the ones obtained by $C_8$ and higher acids have $V_0$ higher than 400 cSt. Furthermore esters of the pentaerylthritols, the tetrapentanoate and the higher have a satisfactory viscosity at 210° F. but while the first one having a V.I. of 123 already exceeds 400 cSt at 0° F., having a viscosity at 210° F. of only 3.84 cSt, the other ones have a viscosity at 0° F. higher than 500 cSt.

We claim:

1. A mixture of esters for a lubricating composition that is prepared by a process which consists of the esterification of:
   A. a mixture of bifunctional and trifunctional neopentylpolyols wherein the molar ratio of the bifunctional neopentylpolyols to the trifunctional neopentylpolyols is in the range of 1:2.5 to 1:10; and
   B. a mixture of linear monocarboxylic acids containing from 6 to 8 carbon atoms, wherein the molar average is $C_7$, and of linear monocarboxylic acids containing from 12 to 18 carbon atoms, the molar ratio of the $C_6$ to $C_8$ acids and the $C_{12}$ to $C_{18}$ acids being in the range from 4:1 to 19:1.

2. An ester as claimed in claim 1 wherein the bifunctional and trifunctional neopentylpolyols are of the formula:

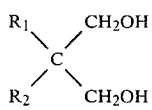

wherein $R_1$ may be $-CH_3$ or $-CH_2OH$ and $R_2$ is $-CH_3$ or $C_2H_5$.

3. An ester as claimed in claim 1, wherein said polyols are 2,2dimethyl 1-3 propanediol and 2 ethyl-2 hydroxymethyl-1,3 propanediol, and the acids are heptanoic, dodecanoic, palmitic and stearic acids.

4. A mixture consisting of at least two esters as defined in claim 1.

5. A lubricating composition containing at least one of the esters defined in claim 1.

6. A lubricating composition containing mineral oil, at least one additive, and at least one of the esters defined in claim 1.

7. An ester that is prepared by a process which consists of the esterification of:
   (a) 0.89 moles of trimethylolpropane;
   (b) 0.11 moles of neopentylglycol;
   (c) 0.574 moles of hexanoic acid;
   (d) 1.1767 moles of heptanoic acid;
   (e) 0.574 moles of acetanoic acid;
   (f) 0.2583 moles of lauric acid; and
   (g) 0.287 moles of palmitic acid.

8. An ester that is prepared by a process which consists of the esterification of:
   (a) 0.16 moles of neopentylglycol;
   (b) 0.64 moles of trimethylolpropane; and
   (c) 2.24 moles of a mixture of 90% by weight of heptanoic acid; 5% by weight of palmitic acid; 5% by weight of stearic acid.

9. An ester that is prepared by a process which consists of the esterification of:
   (a) 0.8 moles of trimethylolpropane;
   (b) 0.2 moles of neopentylglycol; and
   (c) 2.8 moles of a mixture of 87.74% by weight of heptanoic acid; 2.88% by weight of dodecanoic acid; 4.82% by weight of palmitic acid and 4.82% by weight of stearic acid.

* * * * *